UNITED STATES PATENT OFFICE.

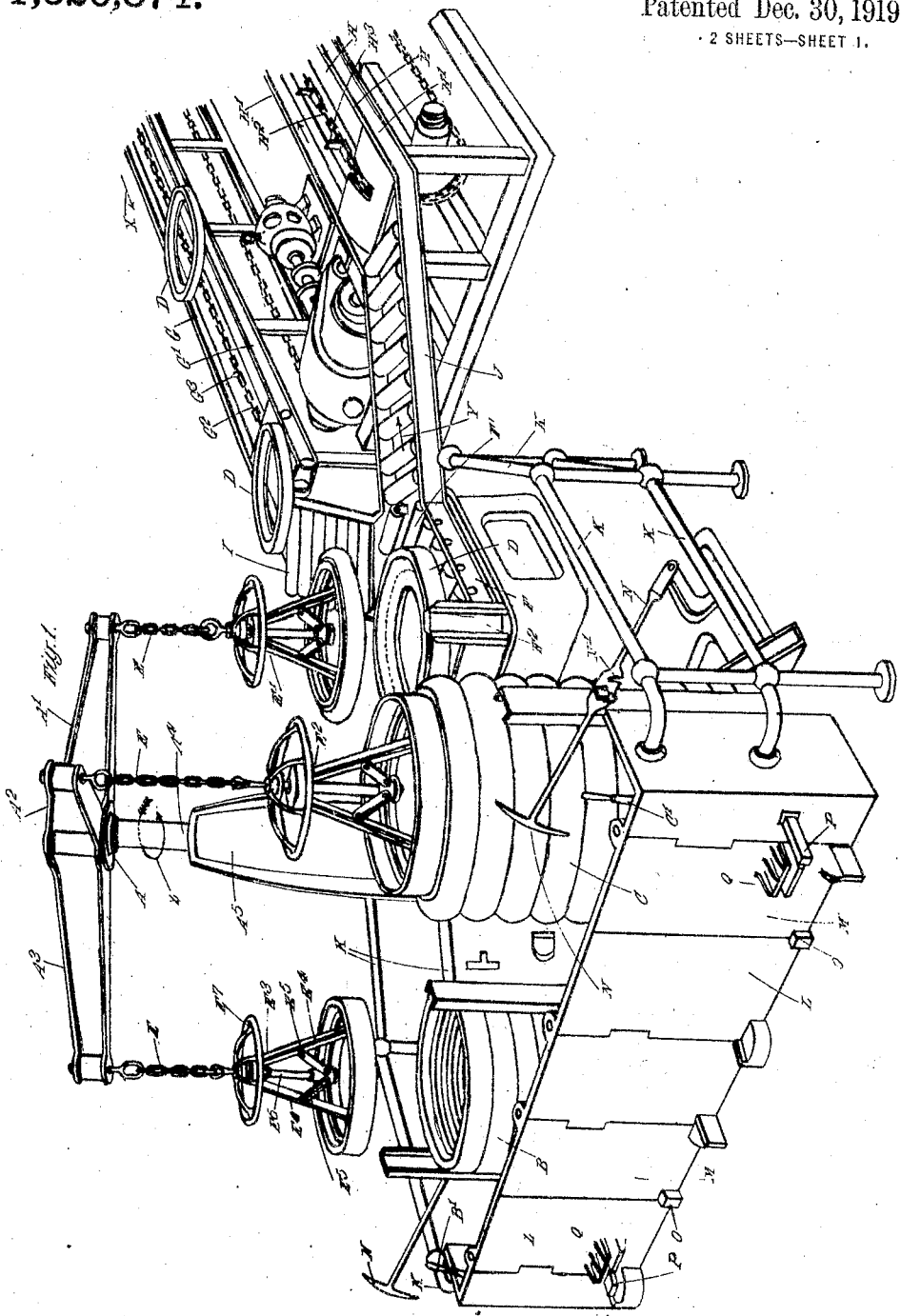

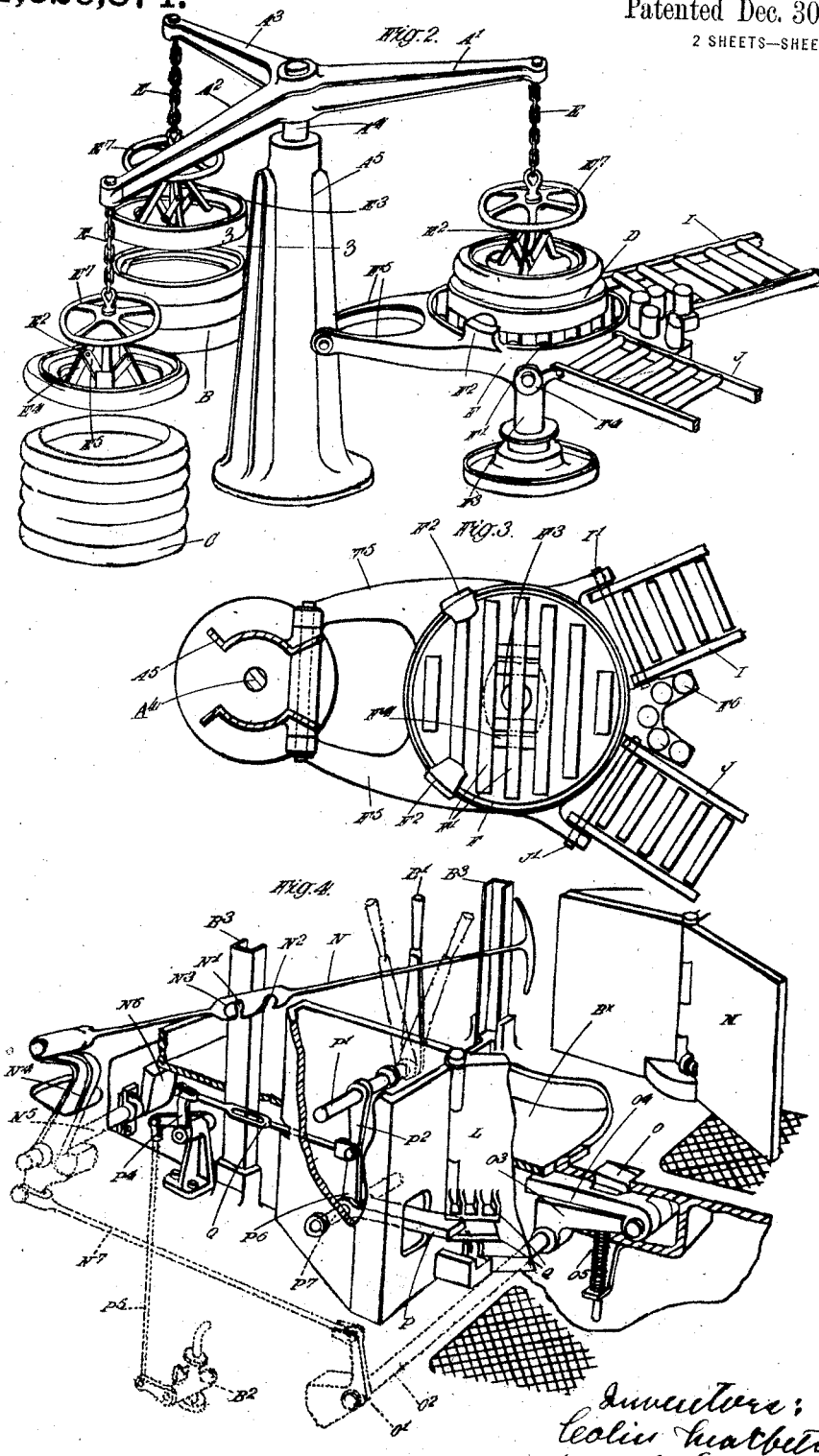

COLIN MACBETH AND ERNEST SULLIVAN, OF BIRMINGHAM, ENGLAND, ASSIGNORS TO THE DUNLOP RUBBER COMPANY, LIMITED, OF WESTMINSTER, LONDON, ENGLAND.

MANUFACTURE OF TIRES.

1,326,874.  Specification of Letters Patent.  Patented Dec. 30, 1919.

Application filed March 26, 1919. Serial No. 285,356.

*To all whom it may concern:*

Be it known that we, COLIN MACBETH and ERNEST SULLIVAN, both subjects of the King of Great Britain, residing at Para Mills, Aston Cross, Birmingham, in the county of Warwick, England, have invented certain new and useful Improvements Relating to the Manufacture of Tires, of which the following is a specification.

This invention relates to the manufacture of tires and has for its chief object to expedite the various operations involved in placing tires in their molds prior to vulcanization by dispensing with manual labor to a large extent and making use of mechanical means for lifting, lowering and carrying the heavy tire molds. The invention is especially applicable to the placing of unvulcanized solid rubber tires into their molds which usually comprise a lower part to receive the tire, an upper part and an internal core which latter is fitted in the foundation base band of the tire. The invention is however applicable to the placing of pneumatic tire covers built up on cores into molds each comprising two or more parts.

According to this invention we provide a turret crane in conjunction with means for supplying the tires and molds to certain positions in close proximity to the crane, for enabling the tires to be successively attached to the crane and placed by the crane into the molds, the construction and arrangement of the apparatus being such that during the various operations involved the tires and molds are supported, lifted and moved as required by mechanical means, although movement of the said tires and molds may in some of the operations be obtained by the action of gravity, thereby avoiding or reducing manual effort to a large extent in carrying out the various operations. In the case of placing solid rubber tires in their molds, the turret crane may be used in conjunction with hydraulic or other elevating devices, one of which receives a pile of cores and another a pile of tires, the position of the said elevating devices relatively to the crane being so controlled as to enable suitable grabs or suspending devices on the said crane to be successively attached to the uppermost one of the pile of cores; the crane is then moved to carry the attached or suspended core to the pile of tires to permit of its being attached to the uppermost tire, after which the suspended core and tire are together moved into a position in which they can be deposited or placed in the lower part of the mold which is supplied or brought to the required position by any appropriate means. After the mold has been filled or loaded by the crane it may be carried away by suitable means such as a conveyer and these various operations are repeated in proper sequences until the desired number of tires have been dealt with. By this arrangement it is not necessary to lift, lower or carry the cores, tires and molds by manual effort and the various mechanical operations may be carried out expeditiously without one operation interfering with the other. The lower mold parts are preferably supplied successively by conveyers to the position in which each can receive a tire, and each mold when loaded may be removed by another conveyer to allow another empty mold to be brought into position to receive another tire. In the case of placing pneumatic tire covers in molds the covers would be first built up on cores and the cores with the covers thereon would be successively attached to the crane which would then be moved to deposit or place the tire core and cover into the mold. With regard to the aforesaid elevating devices, locking means may be provided which render them inoperative when being loaded and which prevent access to the said devices when they are operative as hereinafter described.

In order that the said invention may be clearly understood and readily carried into effect the same will now be described more fully with reference to the accompanying drawings, in which:—

Figure 1 is a general diagrammatic perspective view of one construction of the apparatus designed for use in the placing of solid rubber tires in their molds.

Fig. 2 is a diagrammatic perspective view of an apparatus generally similar to that shown in Fig. 1 but employing a modified construction of mold supporting table.

Fig. 3 is a part sectional plan view taken approximately on the line 3—3 of Fig. 2 showing more particularly the mold supporting table and the mold supplying and removing runways.

Fig. 4 is a fragmentary perspective view illustrating details of the aforesaid locking means.

A represents a three armed turret crane, B a pile of cores, C a pile of solid rubber tires and D represents a lower mold part hereinafter referred to as the mold.

The three horizontal arms A', A², A³, of the turret crane are constructed to be simultaneously angularly movable on the upper end of a vertical ram A⁴ adapted to be moved vertically in a cylinder A⁵ by hydraulic pressure. At the ends of the arms A', A², A³, grabs or suspending devices, E', E², E³ are connected by chains E or the like, the said grabs each comprising three gripping or supporting arms E⁴ adapted to be moved by links or levers E⁵ which are controlled by a screwed vertical rod E⁶ and a handwheel E⁷ to expand or contract the arms E⁴. Two elevating devices such as hydraulically operated platforms (not shown in Figs. 1, 2 and 3) are situated adjacent to the turret crane, and respectively support the pile of the cores B and the pile of the tires C, (the core platform B˟ being shown in Fig. 4) while as shown in Fig. 1 a third but fixed platform or table F supports one mold at a time in position ready to be filled or loaded; the molds are successively supplied to and removed to and from the table F by conveyers G and H respectively, the actual transfer of the molds from the conveyer G to the table F and from the table to the conveyer H being effected by means of roller runways I and J. The supply conveyer G for supplying the empty molds comprises a track having parallel bars or rails G', G' on which the mold is supported horizontally and an endless moving chain G² interposed between the two bars or rails G' and having suitable lugs or projections G³ which engage with the interior surfaces of the molds and pull the latter in the direction of the arrow X; the supply conveyer moves the empty molds successively one behind the other and deposits them in succession on to the roller runway I down which each mold slides or gravitates on to the table F which supports the mold in position to receive the tire and core. The said table or support F is composed of a number of rollers F' and has stops F² to fix or determine the proper position of the mold on the rollers F' which latter permit of the loaded mold being laterally moved by an operator without lifting on to the roller runway J down which each loaded mold slides or gravitates in the direction of the arrow Y on to the removing conveyer H comprising track rails H' and a moving chain H² having projections H³ for engaging with the internal periphery of the loaded mold so as to draw it along to a vulcanizing press.

Assuming the crane arms A', A², A³, to be unloaded the turret crane is placed into a position in which its three arms are respectively directly above the pile of cores B, the pile of tires C and the mold platform F and in commencing the sequence of the necessary operations, the turret crane is lowered by controlling the hyraulic means to enable the grab above the pile of cores to be attached to the uppermost core by hooked ends on the supporting arms E⁴ being placed under an internal flange on the core so that the latter is supported on the arms E⁴; the turret crane is then raised and angularly moved in the direction of the arrow Z carrying with it the attached or suspended core; when the arm carrying the suspended core assumes a position over the pile of tires C the crane is lowered so that the suspended core is placed within the uppermost tire of the pile C. The cores make a fairly tight fit in the tires to enable the tires to be lifted by the cores being raised, but if desired any suitable means may be provided to give the necessary adhesion. The aforesaid angular movement of the crane brings the next succeeding arm of the crane (at that time unloaded) over the pile of cores B and its grab can be fixed to the uppermost core during the lowering of the crane and the affixing of the tire to the suspended core. The crane with a tire and core attached to one arm and a core on the next succeeding arm is again raised and angularly moved in the same direction as before and the two arms carrying respectively the core with the tire fitted thereon and the second core, are moved into a position in which the suspended core with the tire applied is disposed over an empty mold D (which has previously been supplied on to its platform or table F) and the other arm carrying only the core, is disposed over the pile of tires B while the third arm of the crane is at that time disposed over the pile of cores B; this position of the turret crane is illustrated in Fig. 1. The crane is then lowered to deposit the tire and core suspended on the arm A' into the mold D and to enable the core suspended on the arm A² to fit into the uppermost tire of the pile C while the grab E³ on the arm A³ is secured to the uppermost core. The grab E' carrying the tire and core can be released when the latter are placed in the mold D; the crane is again raised so that the mold with the tire and core fitted therein can be moved away on to the gravity roller runway J to allow another mold supplied by the conveyer G to take its place; the released grab is then left free ready to be secured to another core when the crane is again angularly moved in the same direction as before. This cycle or sequence of operations viz: the fixing of the core to the grab, the carrying of the core, the placing same into a tire, the carrying of the tire and core to the mold, the placing of same in the mold and the supply of the empty molds and the removal of the loaded molds continues until all the cores and the tires of the two piles B and C have been used. After each removal of a core and a tire from their respective piles, the platforms supporting them are raised by the hydraulic means controlled by hand levers B' and C' to bring the cores and the tires in the proper horizontal position to enable a grab to be secured to the core and a suspended core to be placed within a tire. The platforms after being fully raised when the last cores and tires have been removed are then lowered flush with the floor. Fresh piles of cores and tires on separate trucks are then deposited on to the respective platforms. The movement of the core and tire platforms may be effected independently by means of suitable hydraulic mechanism under the control of an operator who may also attend to the attaching of the empty grabs to the cores. Another operator controls the movement of the turret crane and also guides the suspended core into the tire and also guides the tire and core into the mold and removes the grab from the tire and core after the placing of the latter in the mold. Rails K K are provided adjacent to the elevating platforms and the mold table F as shown and between the rails K hinged doors L M are provided which afford access to the platforms so that the piles of cores and tires may be placed thereon. Locking devices are provided for preventing the doors L M from being opened during the raising and lowering of the platforms and the arrangement is such that the doors can only be opened when the platforms are level with the floor. For this purpose stops or projections O are provided which when the platforms are raised project upwardly above the floor level against the abutting edges of the doors L M as shown thus preventing the latter from being opened. When the platforms are level with the floor the bolts O are moved by the platform below the floor level so that the doors can be opened. When the doors L M are open the hydraulic means for operating the platforms are locked to prevent operation thereof while the doors remain open. For this purpose bolts P are connected to the valve controlling levers B' C' which bolts engage with flanges Q formed on the end doors (when open) so as to prevent any movement of the bolts P and the levers B' C' to which they are connected thus rendering the hydraulic elevating means inoperative while the doors are open. The locking means are controlled by rods N as hereinafter described. These locking arrangements are provided with a view to safeguarding the operators. For clearness of illustration the details of the mechanism for operating and controlling the locking means other than the parts specifically referred to above, are not shown in Fig. 1 but such details are fully illustrated in the fragmentary perspective view shown in Fig. 4 which shows the mechanism associated with the platform which supports the pile of cores B and it will be understood that a similar and independently operated mechanism is associated with the platform which supports the pile of tires C; a description of the mechanism shown in Fig. 4 will suffice for a proper understanding of the mechanism associated with the platform which supports the tires.

In Fig. 4, B$^x$ represents the core supporting platform which can be moved vertically by a hydraulically operated ram (not shown) and B' is the lever which operates a valve B$^2$ controlling the hydraulic power. The rod N which controls the locking means is provided with two notches N', N$^2$ either of which is adapted to engage with a fixed pin N$^3$ on one of the two uprights B$^3$, B$^3$ between which the platform B is vertically movable. The notch N' enables the controlling rod N and the mechanism for retaining a platform level with the floor to be maintained in an operative or locking position and the notch N$^2$ retains the controlling rod N and the aforesaid mechanism in an inoperative or unlocked position when the platform B$^x$ can be vertically moved. The lower end of the lever N is connected to a lever N$^4$ which through a shaft N$^5$ is connected to a pawl N$^6$ which retains the platform at the level of the floor. The pawl N$^6$ is so arranged that if the platform is down below the floor level it can allow the platform to pass upward even though it be retained in the operative position. As stated above it is desirable that the doors shall not be opened unless the platform B$^x$ is at the floor level. For this purpose the lever N$^4$ is connected by a cross rod N$^7$ to a crank O' secured on a shaft O$^2$ which is connected to a lever O$^3$ having attached to it a second lever O$^4$ which on its upper surface carries the aforesaid stop or projection O which is maintained above the floor level by means of a spring O$^5$ so as to lock the doors L M in the closed position. When the notch N' in the lever N engages with the fixed pin N$^3$, the shaft O$^2$ is operated by the aforesaid connections between the rod N and the shaft O$^2$ so as to bring the front of the lever O$^4$ under the platform so that as the platform reaches the floor level it engages with the lever O$^4$ and depresses it against the action of the spring O$^5$ with the result that the stop or projection O is pulled down below the floor level thereby enabling the doors L M to be opened. In order that the platform B$^x$ shall not be moved when the doors are open the mechanism for controlling the hydraulic valve is rendered inoperative. For this purpose the lever B' is connected to a shaft P' which has a lever P² attached to it and connected to a cross rod P³ which in turn is connected to a bell crank lever P⁴ that operates the valve B² through a spindle P⁵. The lever P' is also connected to another bell crank lever P⁶ which can oscillate on a shaft P⁷ one part of this lever constituting the bolt or projection P which is adapted to be moved upwardly or downwardly when the operating lever B' is actuated and when the door L is shut. When however the end door L is open the bolt or projection P is retained in a definite position by the flanges Q on the door engaging with the same and in this manner the mechanism for operating the valve B² is locked so long as the door is in the open position so that the platform B× cannot be elevated or depressed. When the doors are closed the lever P is free and the controlling lever B' can be moved as desired to actuate the valve B² and cause the movement of the platform B×.

In the modification of the apparatus shown in Figs. 2 and 3 the construction and arrangement is such that it is not necessary to vertically move the turret crane A. In this case the table F which receives the mold D from the runway I leading from the supply conveyer, may be vertically movable, for example, by a hydraulic ram F³, see Fig. 2, so that the mold after being supplied to the table F can be raised for enabling a tire and core suspended above it by one of the crane arms to be placed in the mold. The mold table F may be mounted to turn or rock on a suitable joint F⁴ and it may have extensions F⁵ hinged to the vertical support A⁵ of the crane or to the floor so that when the table F with the loaded mold thereon is lowered the table is tilted or inclined to allow the loaded mold to gravitate on to the roller runway J leading to the removing conveyer H. The ends of the supply runway I and the removal runway J may be hinged to the said table F at I' and J' respectively so as to move with the latter, and the arrangement may be such that the empty mold slides down the supply runway I on to the table when the latter is in the lowered position and after the table with the mold has been raised to receive the tire and core it can again be lowered and inclined as aforesaid to allow the loaded mold to slide on to the removal runway H. The table F comprises suitable rollers F' as described in connection with Fig. 1 to facilitate the movement of the mold on the table, which latter may be capable of swiveling or angular movement for the purpose of directing the mold when the latter is to be moved on to the runway H. Instead of or in addition to the swiveling platforms or table suitable stops F² or guides may be provided for the purpose of directing the mold on to or from the platform or table and suitable stops or guides may be provided on the table itself. The piles of cores B and tires C may be mounted on vertical movable platforms which may be associated with protecting doors and rails as above described in connection with Fig. 1.

Instead of employing elevating tables or platforms for the piles or cores and tires, conveyers may be used for successively bringing or supplying individual cores and tires to the required positions relatively to the crane arms. Moreover in some cases a pile of molds may be supported on an elevating platform operated in a similar manner to the aforesaid platforms which support the cores and the tires. In such an example a conveyer may be employed for removing each mold after the latter has been loaded or filled. The turret crane shown in the drawings is provided with three arms, but in some cases for instance in dealing with pneumatic tire cases already on cores a two armed crane could be used. In some cases a four armed crane would be used as for instance in dealing with molds having a separate tread portion. Therefore the number of arms on the crane can be varied according to requirements.

What we claim and desire to secure by Letters Patent of the United States is:—

1. Apparatus for use in placing tires in molds, comprising a movable device having a plurality of arms to which tires can be attached, means for supplying tires to a position below the path of the arms of the movable device ready for attachment to the said arms, means for supplying empty molds to another position below the path of the arms of the movable device ready to receive the tires after having been attached to said arms and carried to such position by the movable device, and means for conveying molds from the last said position, after having received the tires, whereby while one tire, after having been attached to one of the arms, is being deposited in a mold another tire can be attached to another arm on the said device.

2. Means for use in placing tires in molds, comprising a rotary device having a plurality of arms to which tires can be attached, means for supplying tires to a position below the path of the arms of the rotary device ready for attachment to the arms thereof, means for supplying empty molds to another position below the path of the arms of the rotary device ready to receive the tires after having been attached to said arms and carried to the last said position by the rotary device, and means for conveying molds and the tires contained therein from the last said position, whereby a tire carried by one of said arms can be deposited in a mold while another tire is being attached to another arm of said device and thereafter the rotary device can be moved to bring another attached tire above an empty mold and simultaneously bring a free or unloaded arm above the position where the tires are attached.

3. Apparatus for use in placing tires in molds, comprising a turret crane, elevating means for supporting the tires successively in a certain horizontal position relatively to the crane for attachment to the latter, a conveyer for supplying the empty molds to a definite position relatively to the crane to receive the tires attached the crane and a conveyer for removing the molds after receiving the tires, substantially as and for the purpose specified.

4. Apparatus for use in placing tires in molds comprising a turret crane having a plurality of arms, an elevating device for supporting a pile of tires and placing the uppermost tire in a position permitting of attachment thereof to one of the crane arms, a mold supporting table, a conveyer for supplying empty molds successively to the table, the crane being angularly movable to carry a suspended tire to a position above a mold on the mold table, and a conveyer for carrying loaded molds from the table.

5. Apparatus for use in placing solid rubber tires in molds, comprising a turret crane having suitable arms, an elevating platform for supporting a pile of cores to be fitted in the tires, an elevating platform for supporting a pile of tires, a mold supporting table, a conveyer for supplying the empty molds successively to the table, and a conveyer for carrying away the loaded molds, the construction and arrangement being such that the cores can be successively attached to the crane arms and transferred by the crane to the pile of tires for successive attachment to the uppermost tire after which the suspended tire and core can be transferred to the mold supporting table so as to be placed in the mold, leaving the crane arm which carried the core and tire free to be moved to receive another core, this cycle of operation being continued in the sequence set forth until the piles of cores and tires have been exhausted, substantially as and for the purpose specified.

6. Apparatus for use in placing solid rubber tires in molds, comprising a turret crane having arms carrying suspended grabs for attachment to the tire cores, means for supplying the cores successively to an "attachment" position, means for supplying the tires to a position in which a core suspended on a grab can be fitted in a tire, and means for supplying the empty molds to a position to receive a suspended tire fitted on a core, the crane arms being so arranged that they can be disposed directly above the core position, the tire position a the mold position simultaneously, substantially as and for the purpose specified.

7. Apparatus for use in placing solid rubber tires in molds, comprising a vertically movable turret crane having arms provided with suspended grabs for attachment to the tire cores, means for supplying tire cores to an "attachment" position, means for supplying the tires to a position for attachment to a suspended core, a mold supporting table from which extend means for successively supplying the empty molds and means for carrying away the molds after having received a tire and core suspended from a crane arm, substantially as and for the purpose specified.

8. Apparatus for use in placing solid rubber tires in molds, comprising a turret crane having arms with suspended grabs, elevating means for supporting a pile of cores in such a position that each grab can successively be attached to the uppermost core, elevating means for supporting a pile of tires so that they can be successively attached to a suspended core, a mold supporting table on which the molds can be successively placed to receive a suspended tire fitted on a core, an endless conveyer for carrying the empty molds, a roller runway arranged to receive the molds from the conveyer and deliver them on to the supporting table, a roller runway extending from the mold supporting table for enabling the loaded molds to slide from the table along the runway, and a second endless conveyer arranged to receive the loaded molds from the last said runway substantially as and for the purpose specified.

9. Apparatus for use in placing solid rubber tires in molds comprising a turret crane with three arms having suspended grabs for attachment to the tire cores, means for supplying the cores to an attachment position, means for supplying the tires to a position for attachment to the suspended cores, a mold supporting table for receiving empty molds ready to receive a suspended tire fitted on a core and means whereby relative movement in a vertical direction between the turret crane and the core, tire and mold supporting means may take place for permitting of the attachment of the cores to the grabs, the attachment of the tires to the suspended cores and the depositing into the molds of the suspended tires fitted on the cores, substantially as and for the purpose specified.

10. Apparatus for use in placing solid rubber tires in molds, comprising a turret crane, hydraulically operated elevating means for supporting piles of cores and tires respectively, and a mold table for supporting the molds, the turret crane and mold table being relatively vertically movable, substantially as and for the purpose specified.

11. Apparatus for use in placing tires in molds comprising a turret crane having a plurality of arms, means for supplying tires to a position permitting attachment thereof severally to the arms of the crane successively, means for supporting a mold in position to receive a tire from the crane, and means for successively supplying molds to said support, each arm of the crane traveling successively from the tire attaching position to the mold position and from the latter to the former.

12. Apparatus for use in placing tires in molds comprising a turret crane, means for successively supplying tires to a position to be attached to an arm of the crane, means for supporting a mold in position to receive a tire from the crane, elevating means for effecting relative vertical movement between the crane and the tire supplying and mold supporting means, an inclosure for said elevating means including doors through which access may be had to said means, means for maintaining the doors closed when a member of the elevating means is above a predetermined level, and means preventing operation of the elevating means when the doors are open.

COLIN MACBETH.
ERNEST SULLIVAN.